United States Patent [19]

Kessler

[11] Patent Number: 4,540,492

[45] Date of Patent: Sep. 10, 1985

[54] METHOD AND APPARATUS FOR TREATING WHOLE BLOOD

[75] Inventor: Stephen B. Kessler, Gloucester, Mass.

[73] Assignee: Millipore Corporation, Bedford, Mass.

[21] Appl. No.: 451,380

[22] Filed: Dec. 20, 1982

Related U.S. Application Data

[63] Continuation-in-part of Ser. No. 321,822, Nov. 16, 1981, abandoned.

[51] Int. Cl.³ .................... B01D 31/00; B01D 13/00
[52] U.S. Cl. .................... 210/651; 210/321.1; 210/321.3; 210/433.2; 422/48
[58] Field of Search .......... 210/343, 651, 346, 321.1, 210/433.2, 456, 450, 321.3; 422/48

[56] References Cited

U.S. PATENT DOCUMENTS 3,398,091  8/1968  Greatorex .................... 210/321.1 X

OTHER PUBLICATIONS

Dialung, from T.A.S.A.I.O. 1964, p. 125.
Bixler et al., "The Development of a Diafiltration System for Blood Purification", from vol. XIV, T.A.S.A.I.O., 1968, pp. 99–108.

Primary Examiner—Frank Spear
Attorney, Agent, or Firm—Andrew T. Karnakis; Paul J. Cook

[57] ABSTRACT

Apparatus for oxygenating blood or for separating whole blood into a plasma fraction and an enriched plasma-depleted blood fraction comprising at least two contiguous membrane units, each unit consisting of a first membrane layer, a second membrane layer, a first spacer layer and a second spacer layer. The membrane layers and the spacer layers are configured so that only plasma or oxygen passes through the membrane layers from or into whole blood. Plasma and plasma-depleted blood or oxygen-depleted gas and oxygenated blood are separately collected while preventing admixture thereof with whole blood.

13 Claims, 12 Drawing Figures

METHOD AND APPARATUS FOR TREATING WHOLE BLOOD

REFERENCE TO RELATED APPLICATIONS

This application is a continuation-in-part of application Ser. No. 321,822, filed Nov. 16, 1981, now abandoned.

BACKGROUND OF INVENTION

This invention relates to a process and apparatus for treating whole blood either to separate out plasma or to oxygenate the blood in a manner to permit continuous recirculation of the treated whole blood to the donor.

There are available, at the present time, a wide variety of blood oxygenation apparatus and plasmapheresis apparatus.

Present plasmapheresis devices separate the whole blood of a blood donor in order to recover the plasma which then can be given to a patient requiring a transfusion. Plasmapheresis devices also are utilized to remove the plasma from the whole blood of a patient suffering from diseases associated with an excessively active immunological system that produce excess antibodies such as systemic lupus erythematosus, myasthenia gravis, or Goodpasture's syndrome. In either instance, it is desirable to return the concentrated whole blood to the patient or the donor since, in the former instance, such practice permits the donor to give blood again within a period time about one quarter of that required when the whole blood is donated. In the latter instance, such a practice permits treating the patient's entire blood volume in a single treatment. In both instances, the advantages of such a practice are obvious since it permits either an increased quantity of donated blood per donor or increased effective treatment of a dangerous disease.

It has been proposed to provide a method and apparatus for extracting blood to form a plasma fraction and an enriched blood fraction in U.S. Pat. No. 3,705,100. The apparatus utilizes a reservoir for whole blood and a filtration membrane as well as a flow directing means and a pressure generating means for passing the blood adjacent the membrane, thereby effecting the desired filtration. The primary disadvantage of this device is that it is a batch device and it is incapable of continuously treating blood from a patient and for continuously recirculating enriched blood to the patient. This, of course, is undesirable since it greatly increases the time required for treating a given volume of blood and subjects the patient to multiple punctures in order to obtain samples to be treated.

It also has been disclosed in the final report of NHLBI Contract No. 1-HB-6-2928, June, 1976–April, 1979, to the American Red Cross to utilize a blood filtration system that permits continuous withdrawal of blood and continuous reintroduction of enriched blood back to the patient. However, this device requires a recirculating system for passing blood through a channel and adjacent filter a multiplicity of times. The recirculating system is required to achieve proper balance between shear forces on the blood and pressure drop for the channel height utilized, thereby to minimize blood damage. While the desired balance is achieved, the increased surface exposure for the recirculating blood necessitated thereby also increases the risk of blood damage thereby rendering the apparatus undesirable. In addition, U.S. Pat. No. 4,191,182 to Popovich discloses a plasmapheresis apparatus that requires an undesirable recirculating system for blood in order to maintain the perceived required shear stresses during filtration.

Membrane oxygenators are available wherein blood and oxygen-containing gas are passed into contact on opposing surface of a membrane and wherein oxygen is transferred through the membrane into the blood while carbon dioxide is transferred from the blood through the membrane into the oxygen-containing stream. Presently available membrane oxygenators provide a relatively thick blood film of generally greater than 0.2 mm. The factor limiting efficiency in such devices is resistance to oxygen diffusion in the blood film.

One approach to reducing this resistance is typified by U.S. Pat. No. 4,168,293 in which a woven screen is introduced into the blood channel to induce mixing of the blood. This approach, however, leads to blood damage and potential thrombus formation, especially if used for long-term respiratory support.

Another approach is typified by Bellhouse et al, Transactions of American Society of Artificial Internal Organs, Volume XIX, 1973, page 72, which describes a furrowed membrane and a pulsatile pumping system also intended to create mixing within the blood channels. While potentially less damaging to the blood than a mixing screen, the device and its associated hardware are complex and costly to manufacture. The 0.4 mm blood film thickness of this device is what leads to the necessity for such measures.

It would be highly desirable to provide a membrane device for processing blood whose blood channels approached the dimensions of the microcirculation of the human body (less than 0.1 mm diameter or height). The high surface to volume ratio of such a device would allow the separation of blood into a plasma stream and an enriched blood stream to be reintroduced into the patient in a single pass through the device. Such a device would minimize both blood damage and blood priming volume.

Utilized as a blood oxygenator, the high surface to volume ratio would give inherently high efficiency. Further increase in efficiency results from shear augmentation of oxygen diffusion without the need for blood damaging mixing screens or elaborate externally driven systems.

SUMMARY OF THE INVENTION

This invention provides a multilayer membrane construction comprising a plurality of contiguous membrane units, each of which consists of two membrane layers and two spacer layers. The spacer layers are in alternating relationship with the two membrane layers. In the plasmapheresis embodiment, one spacer layer has a plurality of channels having a critical height between about 0.02 and about 0.2 mm. It is desirable that the channels have a length between 1 and about 10 cm and a width between about 0.05 and 0.5 cm. This spacer layer has an inlet means for introducing whole blood into the channels and an outlet means for accumulating blood depleted of plasma from the channels. The second spacer includes a plurality of channels, each of which are connected to plasma outlet adapted to collect plasma from the whole blood. The membrane units are sealed so that whole blood or plasma depleted blood is prevented from passing into the plasma outlet.

In the blood oxygenator embodiment, one spacer layer utilized for blood flow has a plurality of channels each of which is between about 0.02 and about 0.2 mm in height. The total channel surface area for all spacer layers is between about 0.5 m² and 2.0 m². The channels in a first spacer adjacent a first surface of a membrane layer connect an oxygen gas inlet and a gas outlet. The channels of a second spacer utilized for blood flow adjacent a second surface of the filter layer connect a blood inlet and a blood outlet which are sealed from the gas inlet and gas outlet.

In both embodiments the membrane and spacers must be securely bonded to each other over their entire mating surface. This bonding secures the membrane between adjacent spacer elements and thus limits changes in channel height to local membrane deflection. The width of the individual channels represents the span over which the membrane is free to deflect and is determined by the mechanical properties of typical membrane materials. The combination of the above factors allows critical control of channel heights of less than 0.2 mm.

BRIEF DESCRIPTION OF THE DRAWINGS

Invention will be more fully described with references to the accompanying drawings.

DESCRIPTION OF SPECIFIC EMBODIMENTS

Figure 1:
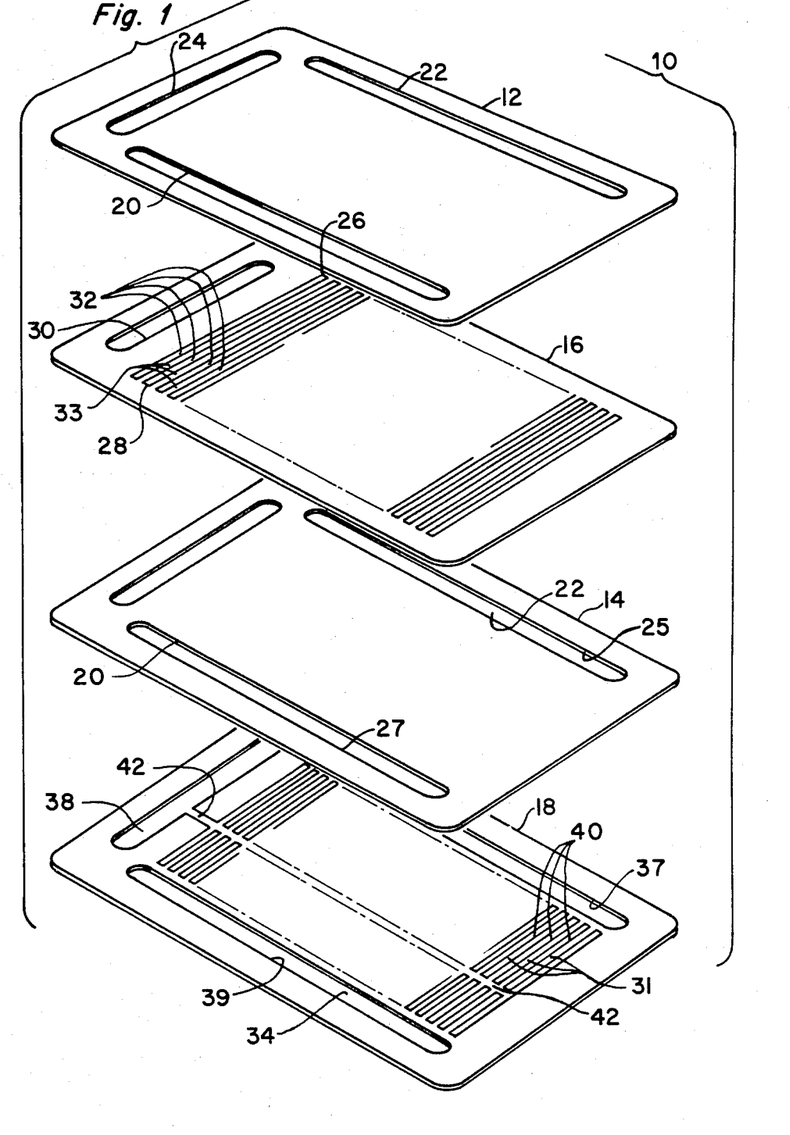
FIG. 1 is an exploded view of the blood plasmapheresis filter unit of this invention.

As shown in FIG. 1, the filter unit 10 comprises, a first membrane 12, a second membrane 14, a first spacer 16, and a second spacer 18. Both the first membrane 12 and the second membrane 14 are of identical construction and are formed from a pliable hydrophilic microporous filter material and having an average pore size extending in submicrometer range from about 0.2 and 1.0 micrometers, preferably between about 0.5 and 0.7 micrometers, currently marketed by Millipore Corporation and identified as MF-Millipore ®, Celotate ®, Durapore ® (Hydrophilic) filters, Duralon ® filter, Polyvic ® filters, Solveret ® filters and Microweb ® filters. Each membrane 12 and 14 is provided with two longitudinal channels 20 and 22 and a widthwide channel 24. The widthwise channel 24 is not in fluid communication with either of the channels 20 or 22. The first spacer comprises a plurality of channels 32 which extend from edge 26 to edge 28 an outlet channel 30. When membranes 12 and 14 are contiguous to spacer 16, the edges 26 and 28 coincide with the edges 25 and 27 respectively. The second spacer 18 is provided with whole blood inlet channel 34, a blood outlet 36 and a widthwise plasma outlet channel 38. The second spacer 18 also is provided with interior channels 40 which provide fluid communication with channel 42 which, in turn, is in fluid communication with plasma outlet channel 38. When spacer 18 is juxtaposed to membrane 14, edges 37 and 39 coincide respectively with edges 25 and 27 of spacer 14. The spacer strips 33 between channels 32 and the spacer strips 31 between the channels 40 are bonded to the next adjacent membrane and provide the necessary support for the membranes adjacent the channels so that membrane flexibility is controlled to maintain the desired channel height.

The channels 32 in first spacer 16 should have a particular height, width and length in order to accommodate the normal blood flow rate from a donor so that blood can be removed continuously while enriched blood from which plasma has been removed can be reintroduced continuously to the donor. In addition, the channel height must be regulated so that the wall shear rate and pressure drop are in the proper range not to cause significant blood damage. Accordingly, it is essential that the channels 32 in the first spacer 16 have a height between about 0.02 and about 0.2 mm, preferably between about 0.06 and 0.12 mm. Furthermore, it is preferred that the channels 32 have a cumulative width between about 20 and about 100 cm, an individual width between 0.05 cm and 0.5 cm and a length between about 1 and about 10 cm, preferably a cumulative width between about 50 and about 70 cm, for all of the channels in all of the first spacers an individual width between 0.08 and 0.12 cm, and a length between about 4 and about 6 cm. It has been found that with typical blood flow rate from a donor of about 60 and about 70 ml/min and a typical blood outlet pressure between about 50 and about 80 mm Hg, utilization of a spacer having the channel size of this invention, shear rates of between 1000 and 3000 sec.$^{-1}$ can be obtained which effects substantial prevention of hemolysis at the corresponding transmembrane pressures.

Figure 2:
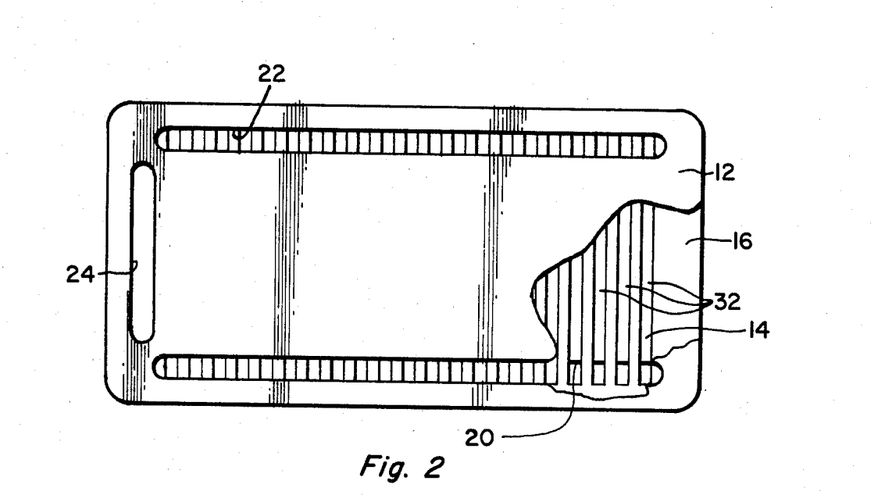
FIG. 2 is a top view of a membrane and the first spacer of FIG. 1 in contiguous relationship.

Referring to FIG. 2, the channels 32 of first spacer 16 are shown to overlap into channel 20 and 22 of membrane 14. This overlap permits introducing of whole blood into channel 20, passage of the whole blood lengthwise along channels 32 while being in contact with membrane 14 and removal of plasma-depleted blood from channels 32 through widthwise channel 22.

Figure 3:
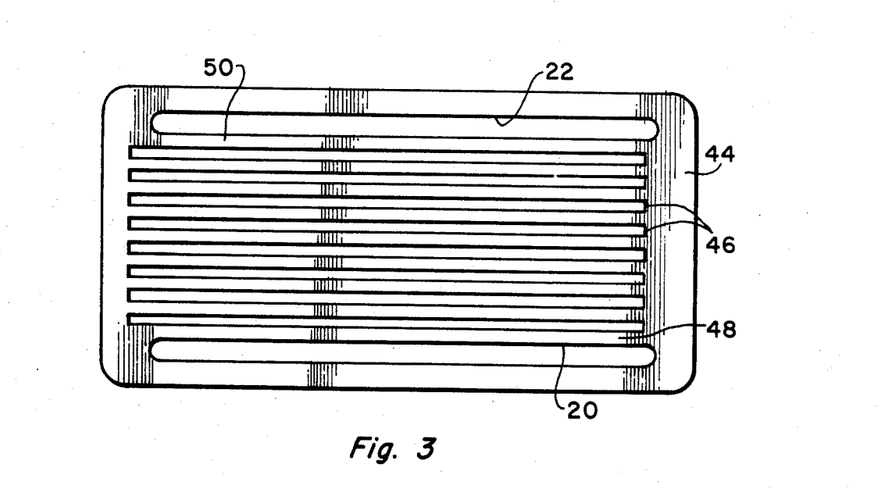
FIG. 3 is a top view of an alternative second spacer construction.

Referring to FIG. 3, the second spacer 44 can comprise a whole blood inlet 20 which is spaced apart from channels 46 by means of spacer width 48 so that blood in inlet 20 cannot pass directly into channels 46 but can only move through parallel channels 32 (see FIG. 1). Thus, only plasma which has passed through a membrane 14 or 12 can enter channels 46. In this configuration, the parallel channels 46 can overlap into a widthwise channel 24 (see FIG. 1) or can be in fluid communication directly with a channel for removing plasma from the housing (see FIG. 6). The plasma-depleted blood outlet 22 also is insulated from parallel channels 46 by means of spacer section 50 so that plasma cannot be mixed with plasma-depleted blood.

Figure 4:
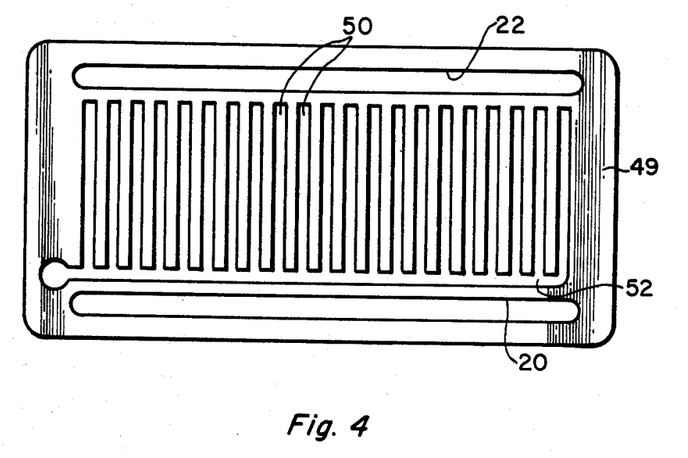
FIG. 4 is a top view of an alternative second spacer construction.

Referring to FIG. 4, the second spacer 9 can comprise longitudinal channels 20 and 22 and parallel widthwise channels 50 which are in fluid communication with longitudinal channel 52. The channels 20 and 22 serve the purposes described above while channels 50 serve to direct plasma removed from the whole blood into channel 52 which is in fluid communication with means for removing plasma from the housing (see FIG. 6).

Figure 5:
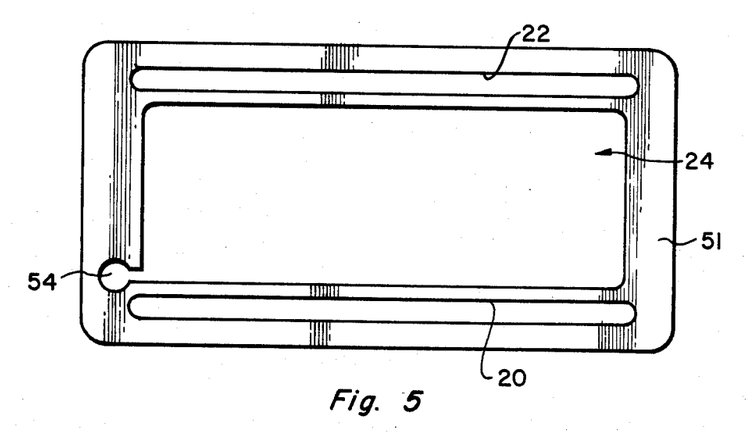
FIG. 5 is a top view of an alternative second spacer construction.

Referring to FIG. 5, the second spacer 61 comprises longitudinal channels 20 and 22 which serve the purposes described above and an open space 4 within the central portion of the spacer 51. The open space 24 is in fluid communication with channel 54 which in turn is in fluid communication with a means for removing plasma from the housing (see FIG. 6). Alternatively the second spacer can comprise a woven mesh of a polymeric fiber material so as to provide space between adjacent membranes thereby to permit plasma flow to the plasma outlet.

Figure 6:
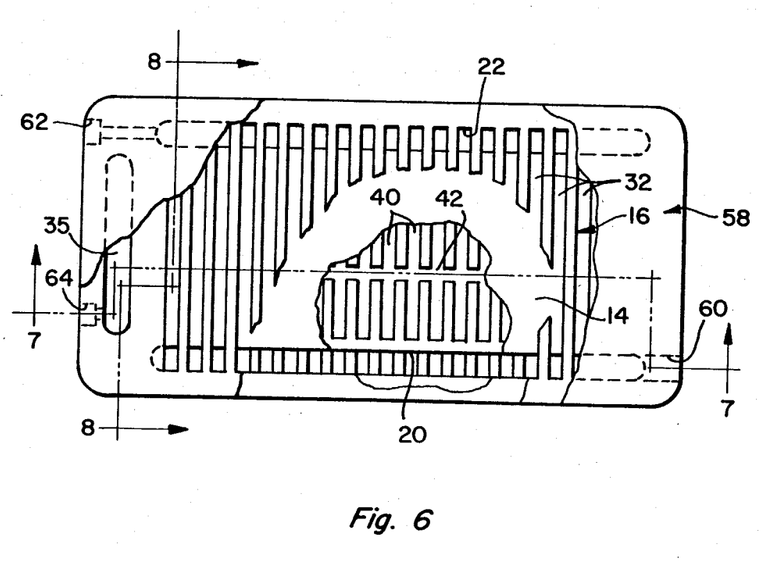
FIG. 6 is a top view of the plasmapheresis housing of this invention.
Figure 7:
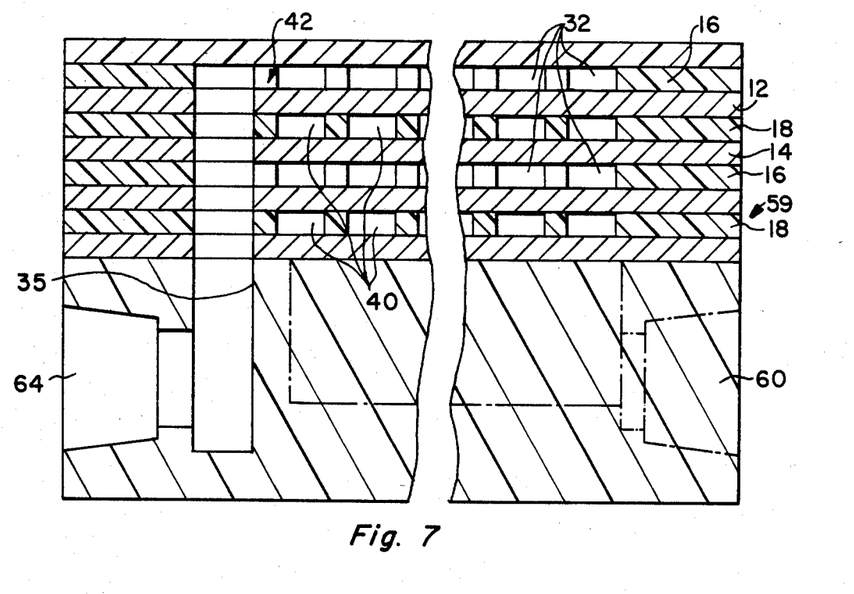
FIG. 7 is a cross-sectional view of the housing in FIG. 6 taken along line 7—7.
Figure 8:
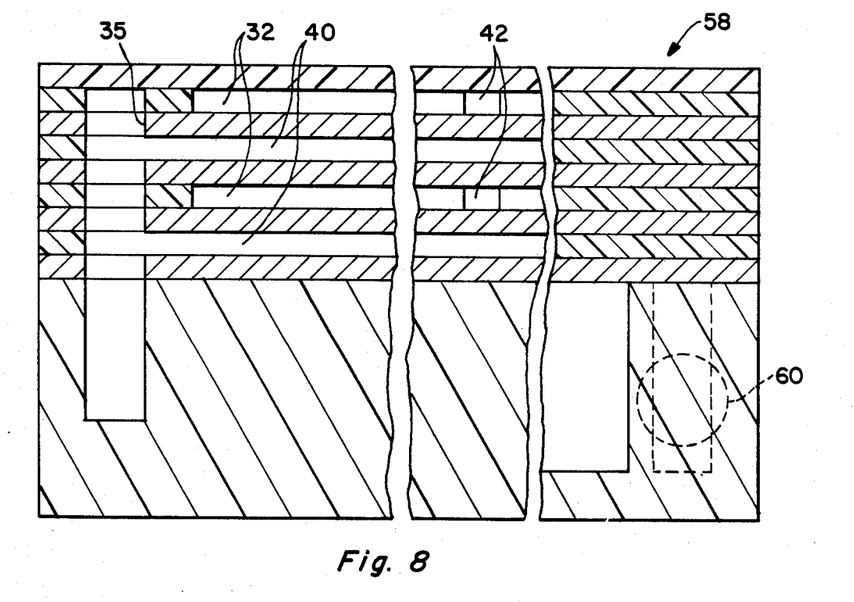
FIG. 8 is a cross-sectional view of the housing in FIG. 6 taken along line 8—8.

Referring to FIGS. 6, 7 and 8, the filter units of this invention are shown in stacked relationship within a housing 58. The whole blood inlet channel 20 of each membrane 12 and 14 and of each spacer 16 and 18 are aligned to form a vertical channel 20 within the housing 58. Whole blood is introduced into the channel 20 through inlet 60. The whole blood passes along channels 32 of spacer 16 into channel 22 which is utilized to collect plasma-depleted blood. As with channel 20, channel 22 is formed by the alignments of channel 22 in each of membranes 12 and 14 and spacer 18 together with the fact that channels 32 overlap into channel 22. The housing 58 is provided with plasma outlet 64 which is utilized to withdraw plasma-depleted blood from channel 22. The housing 58 is also provided with plasma outlet 64 which is in fluid communication with channel 35 which is formed by the alignments of channels 24 of membranes 12 and 14, channel 30 of spacer 16 and channel 38 of spacer 18.

In operation, whole blood from a patient or donor enters housing 58 through inlet 60 and passes along channels 32 of spacer 16 widthwise through housing 58. While blood is passing through channels 32, the membranes 12 and 14 allow passage of plasma therethrough while preventing the remainder of the whole blood from passing therethrough. Similarly, whole blood is prevented from directly entering channels 40 or spacer 18 by means of sealing strips 48. Thus, whole blood is prevented from entering channel 22. The plasma which enters channels 40 of spacer 18 is directed through outlets 42 into channel 35. Channel 35 is connected to outlet 64. Suitable tube means are connected to outlets 62 and 64 and inlet 60 to permit withdrawal of whole blood directly from a patient or donor and reintroduction of plasma-depleted blood directly into the patient on a continuous one pass basis.

Figure 9:
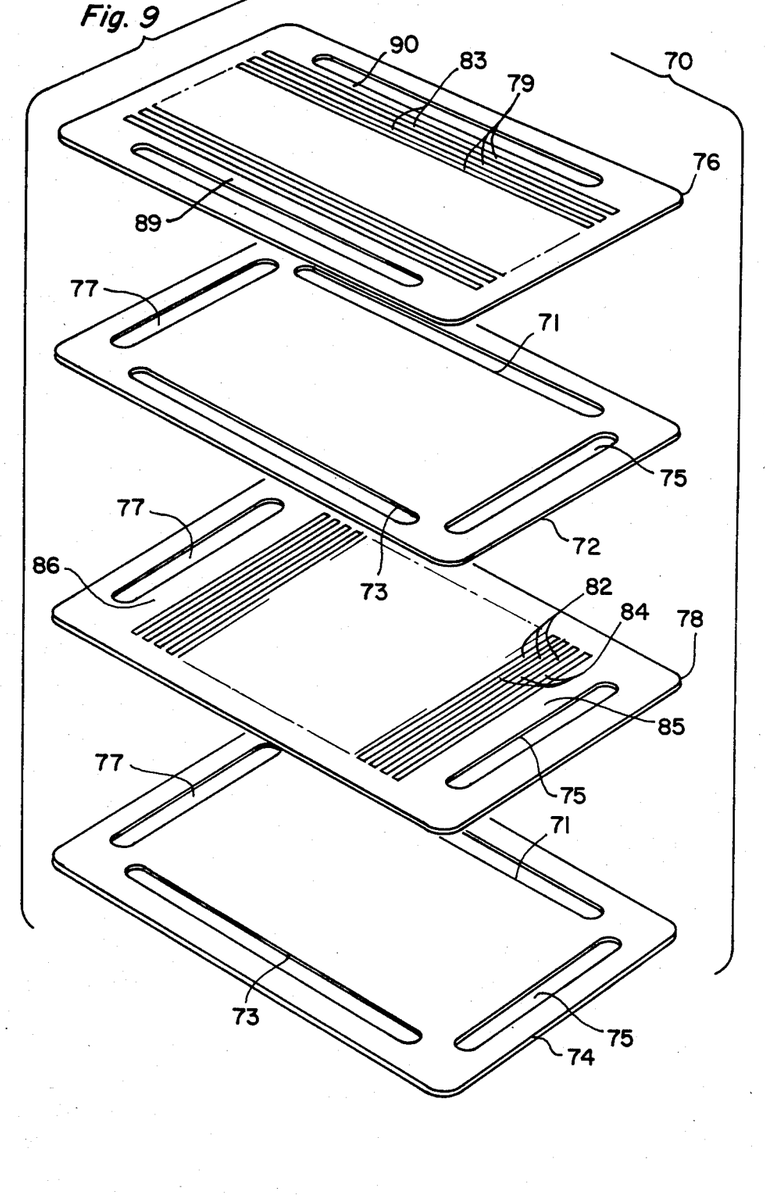
FIG. 9 is an exploded view of the blood oxygenator filter unit of this invention.
Figure 10:
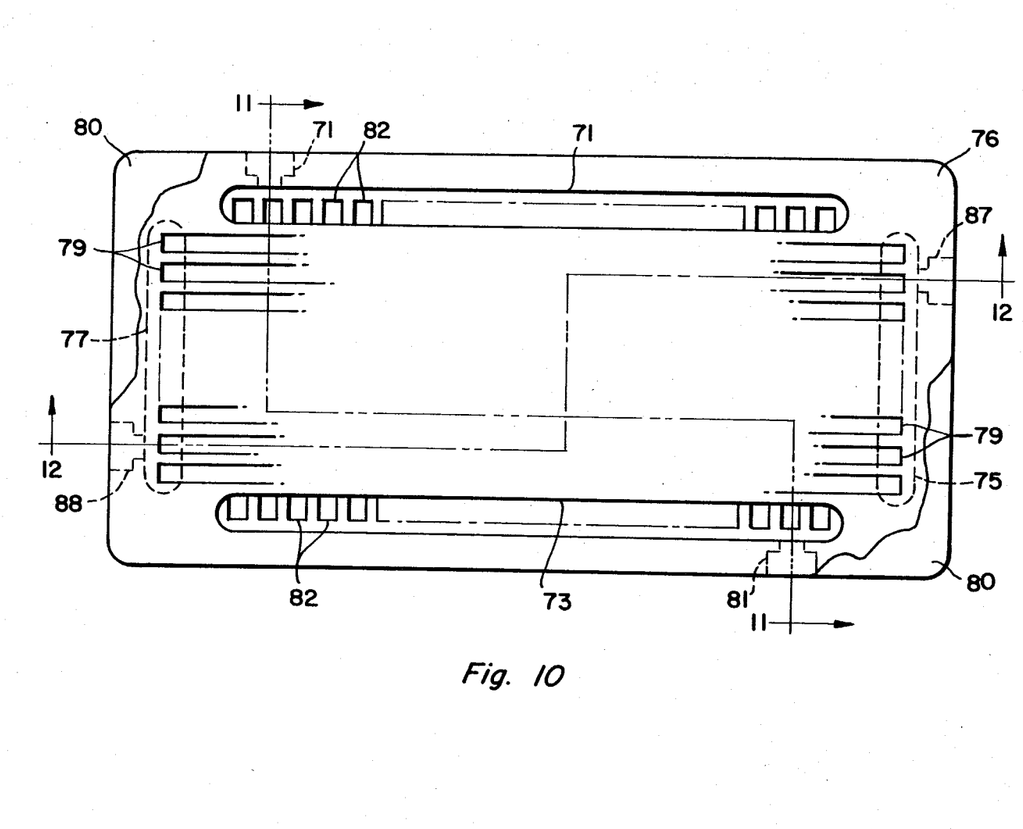
FIG. 10 is a top view of the blood oxygenator filter unit.
Figure 11:
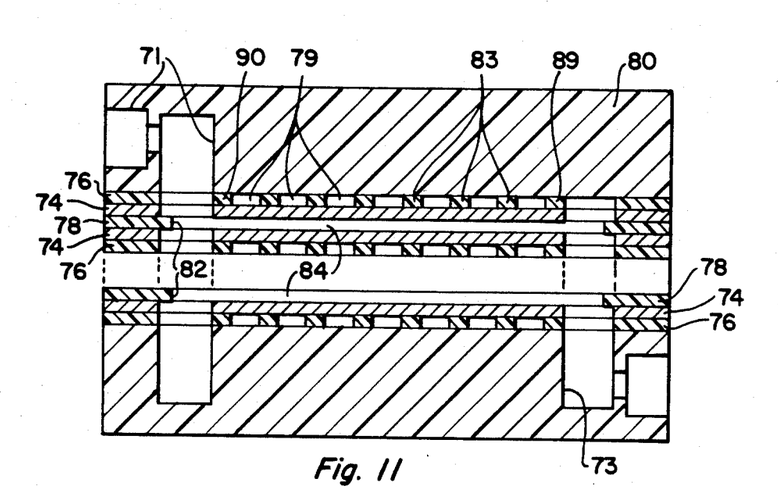
FIG. 11 is a cross-sectional view of the filter unit of FIG. 10 taken along line 11—11.
Figure 12:
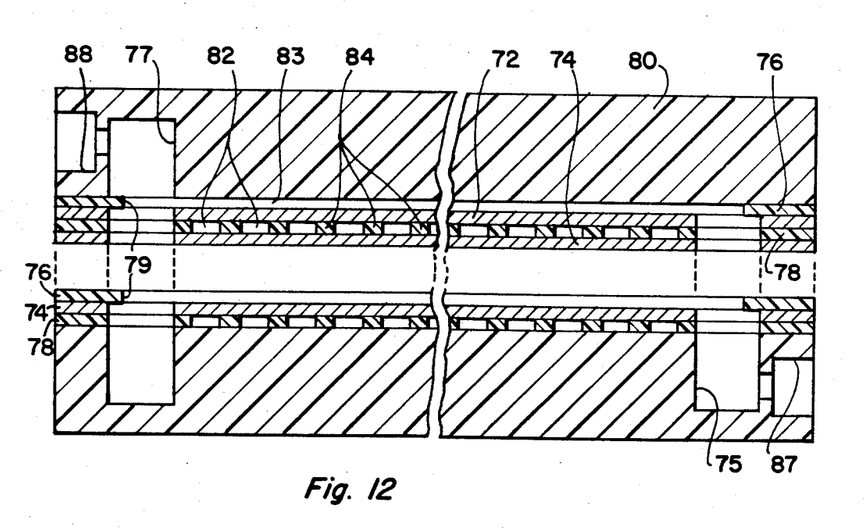
FIG. 12 is a cross-sectional view of the filter unit of FIG. 10 taken along line 12—12.

As shown in FIG. 9, the filter unit 70 for the blood oxygenator comprises, a first membrane 72, a second membrane 74, a first spacer 76, and a second spacer 78. Both the first membrane 72 and a second membrane 74 are of identical construction and are formed from hydrophobic microporous membranes such as Fluoropore ® or Durapore ® (hydrophobic) or solid firm such as polydimethylsiloxane, polyalkylsulfone or ethylcellulose perfluorobutyrate. Each membrane 72 and 74 is provided with two longitudinal channels 71 and 73 and two widthwise channels 75 and 77. The widthwise channels 75 and 77 are not in fluid communication with either of the channels 71 and 73. The first spacer 76 comprises of plurality of channels 79 which communicate with channels 75 an 77 when membranes 72 and 74 are contiguous to spacer 76 for passage of oxygen-containing gas through the filter unit 70. Channels 70 of spacer 76 overlap channels 75 and 77 when spacer 76 is contiguous to membranes 74 and 76. The second spacer 78 is provided with interior channels 82 which provide fluid communication between longitudinal channels 71 and 73 when spacer 78 is juxtaposed to membranes 72 and 74 to permit passage of blood through the filter unit 70. The spacer strips 83 between channels 79 and 77 as well as the spacer strips 84 between the channels 82 are bonded to the next adjacent membranes and provide the necessary support for the membranes adjacent the channels so that membrane flexibility is controlled to maintain the desired channel height.

The channels 82 in second spacer 78 should have a particular height, width and length in order to accommodate the normal blood flow rate from a patient so that blood can be removed continuously while oxygen enriched blood can be reintroduced continuously to the patient. In addition, the channel height must be regulated so that the wall shear rate is in the proper range to give sufficient augmentation of oxygen transfer in the blood film. Accordingly, it is essential that the channels 82 in the second spacer 78 have a height between about 0.02 and about 0.2 mm. Furthermore, it is preferred that the channels have an individual width between 0.05 cm and 0.2 cm and a length between about 1 and about 10 cm, preferably an individual width between 0.08 and 0.12 cm.

When utilizing the blood oxygenator shown in FIGS. 9 10, 11 and 12, the filter units 70 of this invention are in stacked relationship within a housing 80, the whole blood inlet channel 71 is in fluid communication with channel 71. Whole blood is introduced into the channel 71 and passes along channels 82 of spacer 78 into channel 73 which is utilized to collect oxygenated blood for removal through blood outlet 81.

In operation, whole blood from a patient enters housing 80 through inlet 71 and passes along channels 82 of spacer 78. While blood is passing through channels 82, the membranes 72 and 74 allow passage of oxygen therethrough while preventing the blood from passing therethrough. Similarly, whole blood is prevented from directly entering channels 75 and 77 of spacer 78 by means of sealing strips 85 and 86. Oxygen enters gas inlet 87, passes into channel 75 and channels 79 and passes through membranes 72 and 74 into blood within channels 82. Oxygen-depleted gas passes into channel 77 and out gas outlet 88. Oxygen gas is prevented from passing directly into the blood by means of sealing strips 89 and 90. The gas utilized generally has a pressure of between about 100 mm Hg and 300 mm Hg above atmospheric in order to effect transfer of oxygen in proper concentrations without causing gas bubbling through the filter or in the blood. A mixture of oxygen with other gases such as $CO_2$, or $N_2$ can be utilized. The oxygenated blood is directed through outlets 81 which can be connected to suitable tube means to permit withdrawal of whole blood directly from the patient and reintroduction of oxygenated blood directly into the patient on a continuous one pass basis.

I claim:

1. Apparatus for treating whole blood to effect material transfer from or into the whole blood which comprises:
    at least two contiguous membrane units, each unit consisting of a first membrane layer, a second membrane layer, a first spacer layer positioned on a first surface of the first membrane layer and a second spacer layer positioned between a second surface of said first membrane layer and a first surface of said second layer, each of said membrane layers and said spacer layers being securely bonded over their entire mating surfaces, said first spacer layer having a plurality of channels extending through the thickness of said first spacer layer, said channels having a width and length to permit continuous removal of whole blood from a patient for passage through said channels and continuous reintroduction of plasma depleted blood to the patient, each of said channels being between about 0.02 and 0.2 mm in height, inlet means for introducing whole blood into said channels and blood outlet means for removing treated blood from said channels, said second spacer including means for introducing material into said whole blood or for removing material from said whole blood through said membrane layers, sealing means associated with each of said first and second spacers for preventing whole blood from being admixed with material introduced into said whole blood without first passing said material through a membrane layer or for preventing whole blood from being admixed with blood from which a blood fraction has been removed.

2. The apparatus of claim 1 including means for collecting plasma and plasma-depleted whole blood from said membrane units and for introducing whole blood into said membrane units.

3. The apparatus of claim 1 including means for introducing a free-oxygen containing gas into channels positioned within said second spacer, means for introducing whole blood into the channels of said first spacer, means for removing oxygenated blood from said membrane units and means for removing oxygen-depleted gas from said membrane units.

4. Apparatus for separating whole blood into a plasma fraction and an enriched, plasma-depleted blood fraction which comprises at least two contiguous membrane units, each unit consisting of a first membrane layer, a second membrane layer, a first spacer layer positioned on a first surface of the first membrane layer, and a second spacer layer positioned between a second surface of said first membrane layer and a first surface of said second membrane layer, each of said membrane layers and said spacer layers being bonded over their entire mating surfaces, said first spacer layer having a plurality of channels extending through the thickness of said first spacer layer, each of said channels being between about 0.02 and 0.2 mm in height, between 1 and 10 cm in length, cumulatively between about 20 and 100 cm in width, and individually between about 0.05 and 0.5 cm in width, inlet means for introducing whole blood into said channels, blood outlet means for removing blood depleted of plasma from said channel, said second spacer including means connected to a plasma outlet adapted to collect plasma from said whole blood, sealing means associated with each of said first and second spacers for preventing whole blood or plasma-depleted blood from passing into said plasma outlet, and means for separately collecting plasma and plasma-depleted whole blood from said membrane units and for introducing whole blood into said membrane units.

5. The apparatus of claim 4 wherein the channels in said first spacer layer are each between about 0.06 and 0.12 mm in height.

6. The apparatus of claim 4 wherein the channels in said first spacer layer are each between about 4 and 6 cm in length.

7. The apparatus of claim 4 wherein the channels in said first spacer layer are each and between about 50 and 70 cm in cumulative width.

8. The apparatus of claim 4 wherein said second spacer include a plurality of parallel channels each directly connected to a plasma outlet.

9. The apparatus of claim 4 wherein the plurality of channels in said second spacer are connected to a passageway running perpendicular to said channels and said passageway is connected to said plasma outlet.

10. The process for treating whole blood to effect material transfer from or into the whole blood which comprises:

continuously introducing whole blood into first channels of a first spacer of a membrane unit, said first channels each between about 0.02 and 0.2 mm in height and extending through the thickness of said first spacer layer, each of said membrane layers and said spacer layers being bonded over their entire mating surfaces, said membrane unit consisting of a first membrane layer, a second membrane layer, said first spacer layer positioned on a first surface of the first membrane layer, and a second spacer layer positioned between a second surface of said first membrane layer as a first surface of said second layer, continuously removing treated blood from said first channels, effecting material transfer between said whole blood, through said membrane layers and from or into second channels in said second spacer, removing material from said second channels through an outlet connected with said second channels, and providing sealing means with each of said first and second spacers to prevent whole blood from being admixed with material introduced into said whole blood without first passing said material through a membrane layer or for preventing whole blood from being admixed with blood from which a blood fraction has been removed.

11. The process of claim 10 wherein a free-oxygen containing gas is introduced into the channels of said second spacer and wherein free oxygen is transferred into said blood within said first spacer.

12. The process of claim 10 wherein plasma is removed from said whole blood, through said membrane layers and into the second channels in said second spacer.

13. The process of claim 12 wherein the first channels have a length between about 1 and 10 cm, a cumulative width between about 20 and 100 cm and an individual width between about 0.05 and 0.5 cm.

* * * * *